Sept. 22, 1942. M. H. TUFT ET AL Re. 22,182

ROW CROP HARVESTING IMPLEMENT

Filed Sept. 29, 1938 4 Sheets-Sheet 1

INVENTORS
CLARENCE T. RASMUSSEN
MILES H. TUFT
BY
ATTORNEYS

ROW CROP HARVESTING IMPLEMENT
Filed Sept. 29, 1938 4 Sheets-Sheet 2
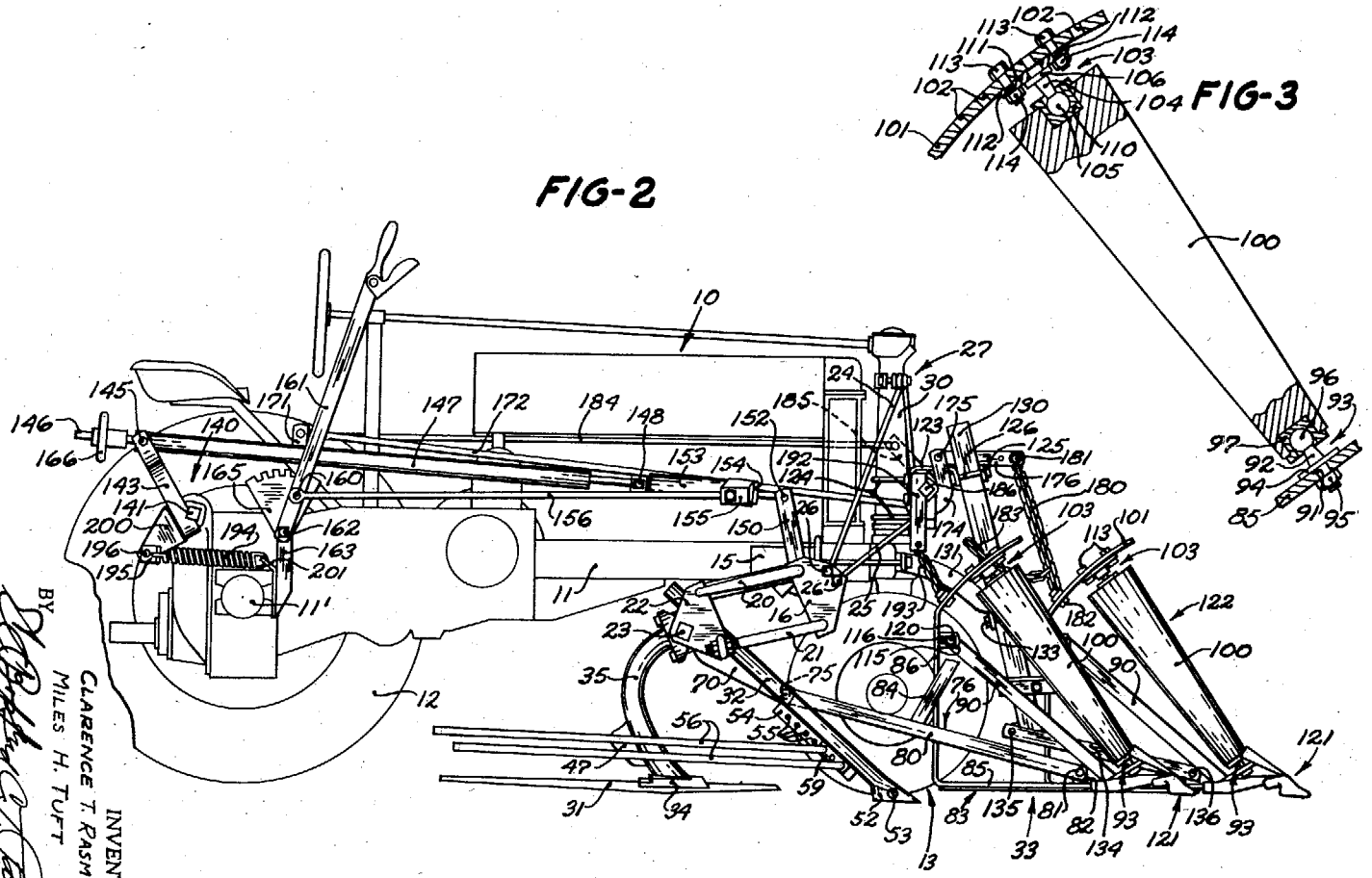
INVENTORS
CLARENCE T. RASMUSSEN
MILES H. TUFT
BY
ATTORNEYS Sept. 22, 1942. M. H. TUFT ET AL Re. 22,182
ROW CROP HARVESTING IMPLEMENT
Filed Sept. 29, 1938 4 Sheets-Sheet 3
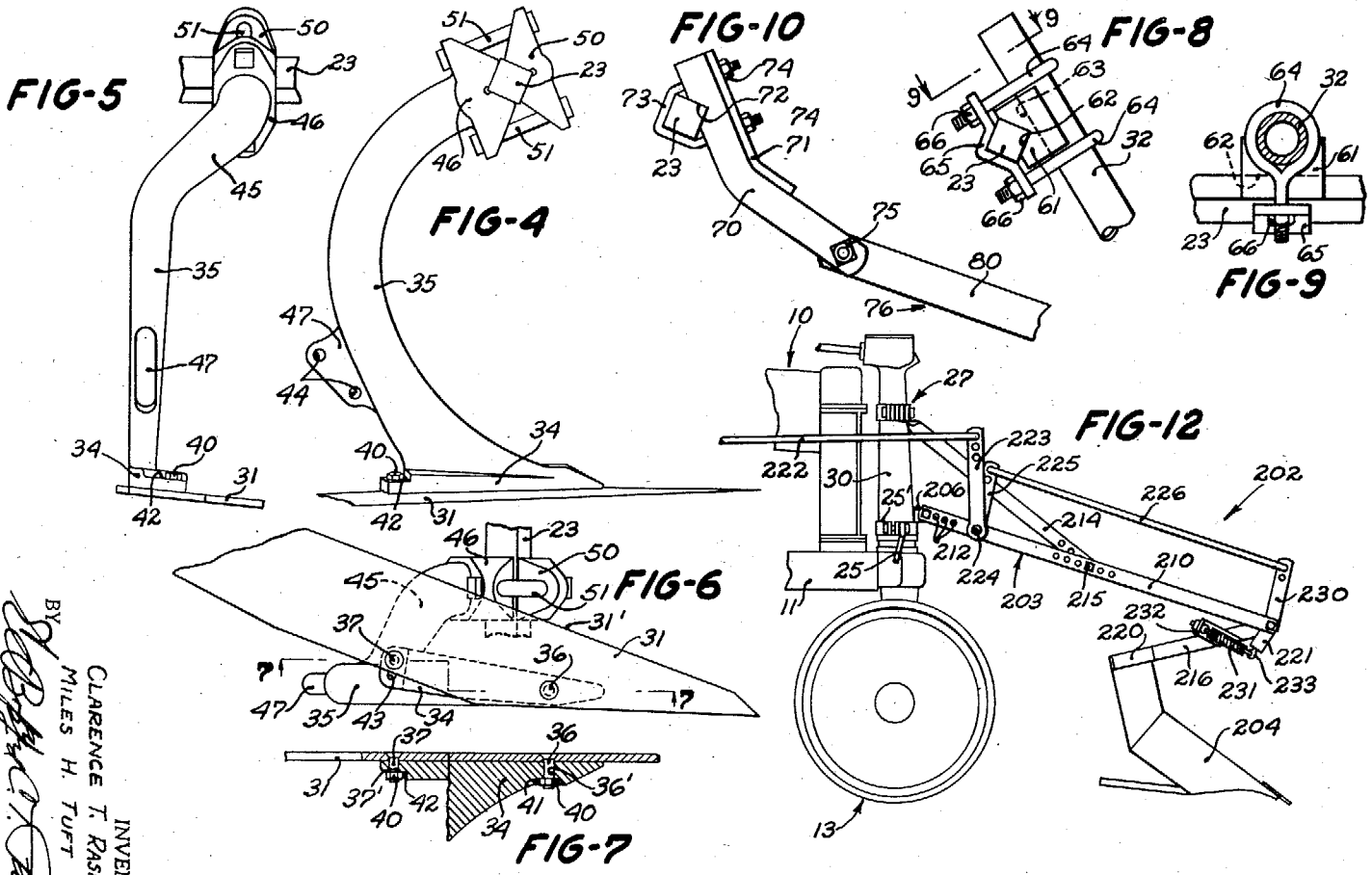
INVENTORS
CLARENCE T. RASMUSSEN
MILES H. TUFT
BY
ATTORNEYS Sept. 22, 1942. M. H. TUFT ET AL Re. 22,182

ROW CROP HARVESTING IMPLEMENT

Filed Sept. 29, 1938 4 Sheets-Sheet 4

INVENTORS
CLARENCE T. RASMUSSEN
MILES H. TUFT
BY
ATTORNEYS

Reissued Sept. 22, 1942

Re. 22,182

UNITED STATES PATENT OFFICE 22,182

ROW CROP HARVESTING IMPLEMENT

Miles H. Tuft, Ottumwa, Iowa, and Clarence T. Rasmussen, Moline, Ill., assignors to Deere & Company, Moline, Ill., a corporation of Illinois Original No. 2,196,446, dated April 9, 1940, Serial No. 232,320, September 29, 1938. Application for reissue November 26, 1941, Serial No. 420,542

46 Claims. (Cl. 56—25)

The present invention relates to row-crop harvesting implements and is more particularly concerned with bean harvesters of the type adapted to be mounted on a tractor. The principal object of our invention is the provision of a new and improved bean harvester which is flexible in operation and is adapted for all crop and soil conditions.

Another object of the present invention is to provide an improved harvesting blade and supporting standard which are designed to increase the efficiency and versatility of the harvester as a whole.

A further object is to provide a bean harvester in which the harvesting blades and supporting standards are laterally adjustable to accommodate a wide variety of row spacings.

Another object is to provide an improved vine divider which is adjustable both vertically and laterally.

Still another object is the provision of an improved roller vine turner for opening a path between the tangled rows of vines without tearing plants out of the ground. A related object is the provision of improved bearing support means for the roller whereby the angle of the latter to the line of advance of the implement can be increased or decreased to meet crop conditions.

Another object of the present invention is to provide improved lifting connections between the tractor power lift and the implement tool holding means embodying both fine and coarse depth gauging means for controlling the working depth of the tools.

A further object is the provision of an improved boot vine turner for separating and deflecting to one side the vines lying in the path of the tractor wheels.

These and other objects and advantages of the present invention will become apparent after a consideration of the following detailed description of the preferred embodiment thereof, reference being had to the accompanying drawings, in which Figure 1 is a plan view of a tractor mounted four-row bean harvester embodying the principles of our invention and showing the blades and windrow rods arranged to form one windrow of cut vines between the rear tractor wheels and one windrow to the outside of each wheel;

Figure 2 is a side elevation of the same machine;

Figure 3 is a partially sectioned detail view, drawn to enlarged scale, of the roller vine turner and adjustable bearing support means;

Figure 4 is a side detail view, drawn to enlarged scale, of the harvesting blade and supporting standard;

Figure 5 is a rear view of the part shown in Figure 4;

Figure 6 is a bottom view of the same part;

Figure 7 is a sectional view taken along the line 7—7 of Figure 6;

Figure 8 is an enlarged detail view of the clamping means for connecting the vine divider to the tool bar;

Figure 9 is a view taken along the line 9—9 in Figure 8;

Figure 10 is an enlarged detail view of the bracket by which the outer roller vine turner is connected to the tool bar;

Figure 12 is a side elevation of the front portion of tractor and boot vine turner shown in Figure 11.

Figure 1:
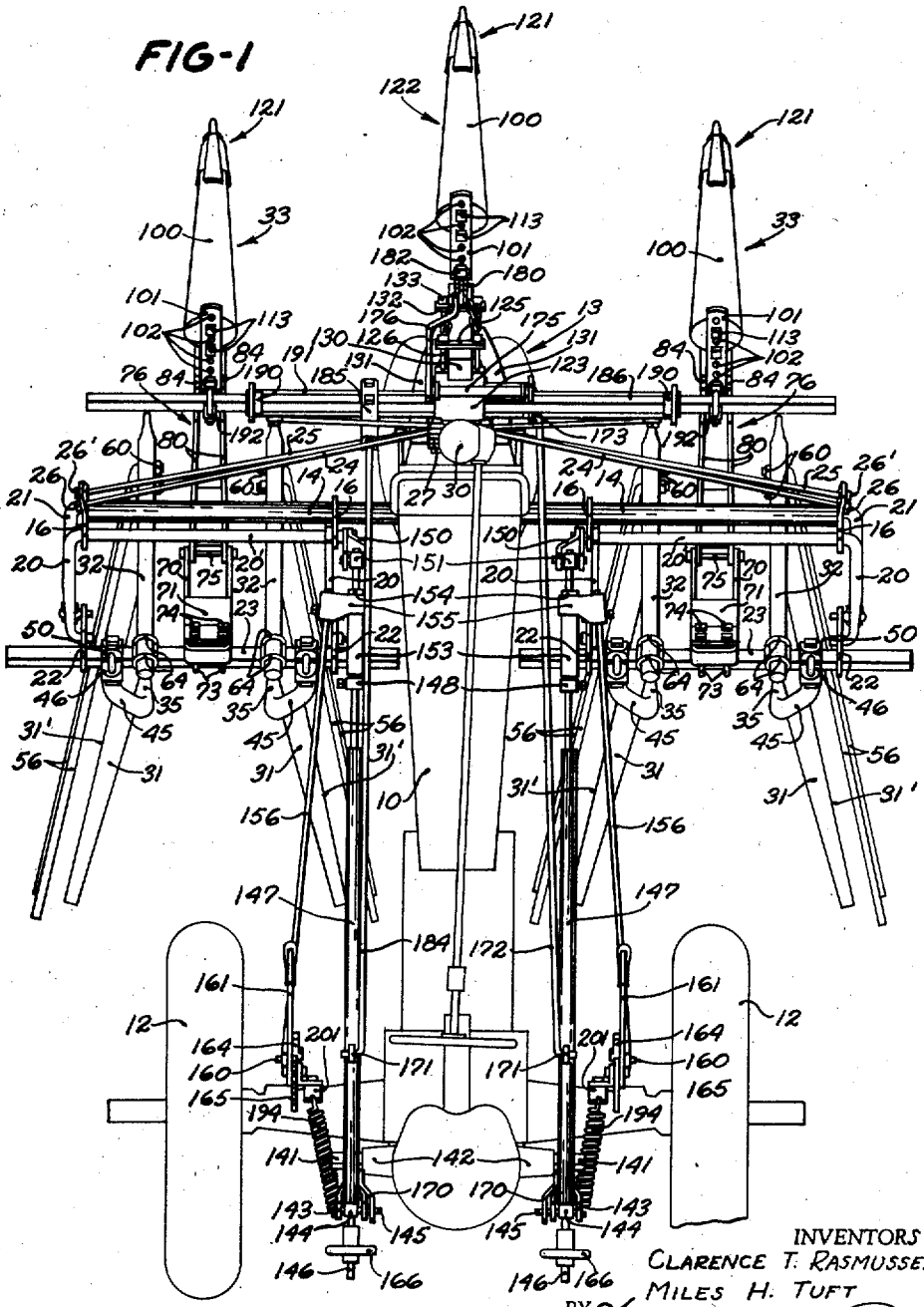

Referring now to the drawings, and more particularly to Figures 1–10, inclusive, reference numeral 10 indicates a tractor having a structural frame 11 carried on a pair of rear driving wheels 12 and a forward dirigible truck 13. The implement attachment comprises a supporting frame which is similar to the cultivator attachment frame shown and described in Patent No. 2,150,665, granted March 14, 1939, to Miles H. Tuft, and reference is directed to the said patent for details of construction. Briefly, the supporting frame consists of a pair of transverse beams 14 which are suitably fixed to the tractor frame 11 and extend laterally outwardly from each side thereof. Preferably, although not necessarily, the beams 14 are in the form of heavy tubular members, each of which is welded at its inner end to an upwardly extending bracket 15, and the latter is bolted to the tractor frame 11. A pair of spaced supporting plates 16 are welded to each of the beams 14 and journaled in each of said plates are two vertically spaced, rearwardly extending, bail members 20, 21. The rear ends of bail members 20, 21 are journaled in plates 22 which are fixed, as by welding, to a transverse tool bar 23, preferably of square cross section. Clamped to the tool bar 23 at spaced intervals are the various tools which will be described in more detail presently, and bracing the supporting beams 14 against the weight of the tools are two diagonal bracing rods 24 which are fixed by bolts 26 to the outer plate 16 and extend upwardly and inwardly to a bracket collar 27 clamped on the upper portion of the tractor steering post 30. The rearward thrust on the beams 14 due to the reaction of the tools in the soil, is taken up by a pair of bracing rods 25 which are likewise fixed to the outer plate 16 by bolts 26' and extend forwardly and inwardly to a suitable bracket member 25' (Figure 12) carried on the lower portion of the steering post 30.

Figure 11:
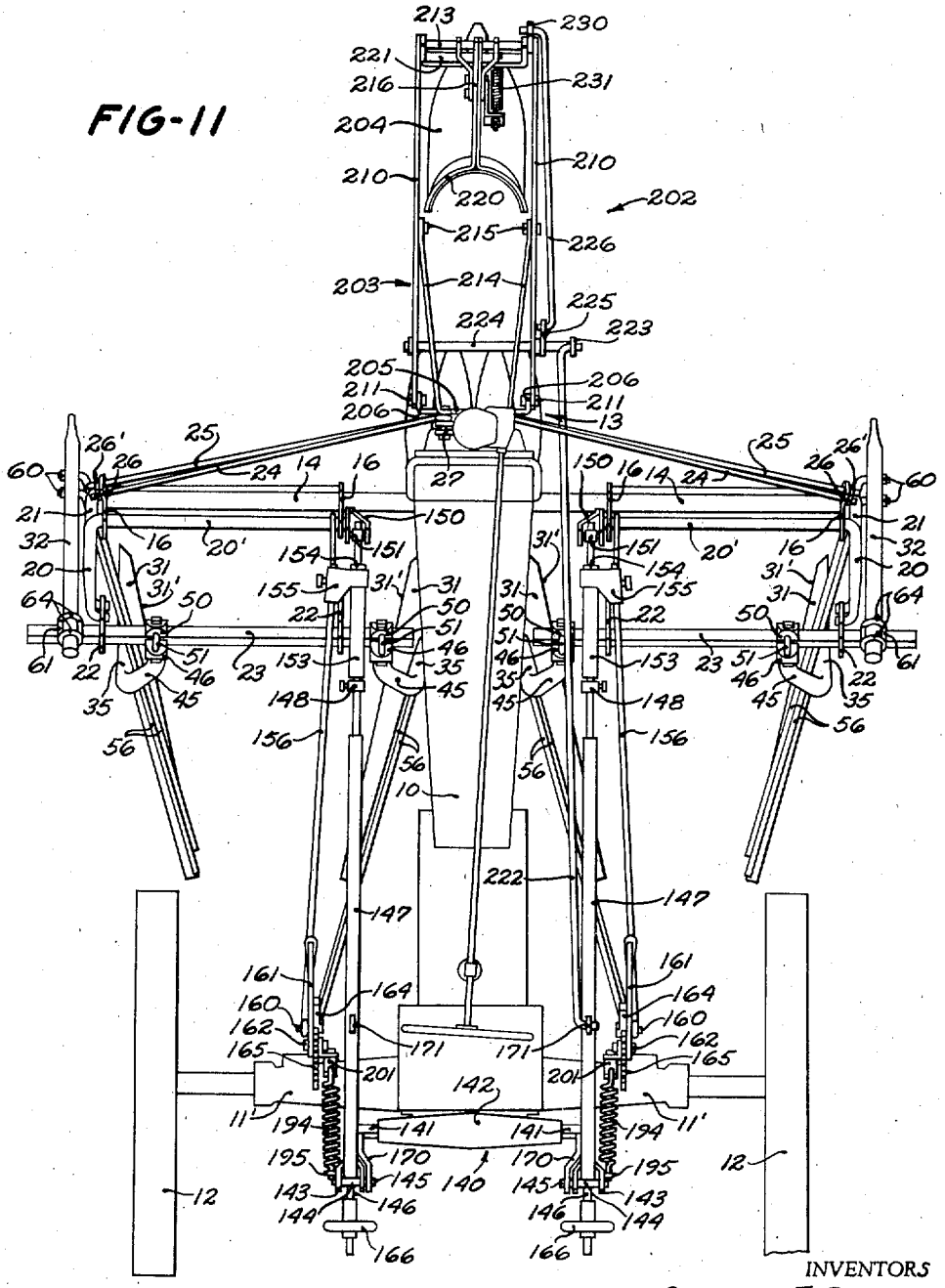
Figure 11 is a plan view of another embodiment of the present invention, showing the blades and windrow rods arranged to form two windrows between the rear tractor wheels, and with a boot vine turner in place of the three roller vine turners shown in the preceding figures.

The tools carried on the tool bars 23 consist of two pairs of left and right blades 31, two pairs of vine dividers 32, and two outer roller vine turners 33. The blades 31 are arranged in pairs on either side of the tractor and in the present embodiment each pair converges forwardly with their cutting edges 31' facing outwardly as shown in Figure 1. Each of the blades is carried by a tool standard or beam 35 and is fastened to the underside of a foot 34 provided at the lower end thereof by two countersunk bolts 36, 37 which are passed through suitably chamfered holes in the blade and aligned holes 36', 37' in the foot 34 and are secured by nuts 40 on the threaded ends thereof. The nut on the forward bolt 36 fits down into a recess 41 provided in the foot 34, giving the latter a smooth, uninterrupted surface over which vines and trash may pass freely without catching. The rearward nut 40 is likewise recessed below the surface of the foot 34 and rests upon a depressed shelf 42. Under certain conditions where the vines are extremely tough or the ground hard, it may be desirable to decrease the angle of the blade 31 to the line of travel of the tractor, and to this end a bolt hole 43 has been provided in the foot 34 adjacent bolt hole 37' and spaced from hole 36' a distance equal to the distance between holes 36', 37'. To change the angle of the blade, the bolt 37 is withdrawn from hole 37', the blade 31 turned about bolt 36 as a pivot to align the hole in the blade with bolt hole 43, and the bolt 37 is passed through the aligned holes and tightened. As will be noted in Figure 5, the blade 31 is disposed at a slight angle to the surface of the ground with the sharpened edge 31' inclined downwardly. This provides clearance and prevents the underside of the blade from dragging or scraping on the ground, reducing friction and thereby decreasing the draft. The standard 35 curves upwardly and rearwardly from the foot 34 and is provided with a lug 47 formed integrally on the back side thereof having holes 44 adapted to receive and hold windrow rods for deflecting the cut vines to either side. The upper end of the standard curves forwardly again and is bent laterally to form an offset portion 45, the purpose of which will become evident shortly. The end of the standard is provided with a forwardly facing V-shaped socket 46 adapted to fit up against the tool bar 23, and a correspondingly V-shaped cap 50 secured to the standard by bolts 51, as best shown in Figure 4. By virtue of the square cross section of the tool bar 23 and the form of the socket 46 and the clamping part 50, when the bolts 51 are tightened, the standard is rigidly secured to the tool bar against displacement laterally or otherwise. The latter member is of uniform cross section throughout its length so that any desired spacing of the blades may be secured by merely loosening the bolts 51 and shifting the tool standards 35 along the bar 23 to the desired position. Likewise, the right and left hand blades may be rearranged on the tool bar to cut inwardly, as shown in Figure 11, by removing the caps 50 and reversing the position of the standards along the tool bar, or the two outer blades and standards can be removed to convert the implement into a two-row harvester.

The dividers 32 are preferably formed of pipe and are adapted to be clamped to the tool bar 23 adjacent the blade standards 35 and extend downwardly and forwardly therefrom ahead of the blades 31 to separate the rows of intertwined vines, each divider terminating in a flattened and pointed toe 52 having a transverse hole 53 formed therein. Formed integrally along the length of the back side of each divider 32 is a rearwardly projecting lug 54 having a plurality of holes 55 which are adapted to receive and hold windrow rods 56. The latter consist of long rods having the front ends thereof bent laterally at an angle to pass through suitable apertures in a short bar 59 to which the rods are welded. The apertures in the bar 59 are spaced apart to coincide with the holes 55 in the lug 54, and the projecting ends of the rods are passed through holes 55 and threaded to receive nuts 60 on the opposite side of the lug. By tightening the nuts 60 against the lug 54, the windrow rods 56 are rigidly secured to the divider 32, extending rearwardly therefrom at an angle corresponding to the angle of the associated blade 31 to deflect the cut vines to either side and deposit them in windrows suitable for gathering up with a rake or like implement. Where it is not necessary to use the dividers 32, as when the vines are lying close to the ground and are not unduly tangled, the windrow rods 56 may be bolted to the lug 47 on the back of the blade standards 35, and the laterally bent front end portions of the rods passed through holes 44. With this arrangement the blade standard 35 acts in the capacity of the divider 32 to separate the tangled rows of vines. When the rows of vines are extremely tangled and the divider 32 tends to pull plants out by the roots, improved results are often obtained by setting the blades substantially as arranged in Figure 1, raising the pipe dividers on the tool bar 23, and bringing each pair of dividers together to support a rolling colter therebetween in the holes 53.

The dividers 32 are mounted on the tool bar 23 by clamping means best shown in Figures 8 and 9 and comprising a block 61 having a V-shaped notch 62 formed in one side thereof and a substantially U-shaped channel 63 formed in the opposite side thereof and extending at right angles to the notch 62. The block 61 is placed between the tool bar 23 and the divider 32 with the V-shaped notch 62 fitted against one corner of the square tool bar and the divider seated in the channel 63. A pair of eye bolts 64 embrace the divider 32 at either end of the block 61 and the shanks of said eye bolts are passed through suitable apertures in the ends of a clamping member 65 and are secured by clamping nuts 66, as best shown in Figure 8. To adjust the divider 32 laterally, the nuts 66 are loosened and the block 61 and associated clamping elements are shifted along the tool bar 23 to the desired position. Likewise, to raise or lower the divider 32 relative to the ground, the nuts 66 are loosened and the divider is moved up or down through the eyes of eye bolts 64.

The outer two roller vine turners 33 are also mounted on the tool bar 23 and are disposed midway between each pair of blades 31 extending appreciably ahead thereof to open a path through high standing and excessively tangled vines, thus serving as means for guiding the vines to the blades 31. Each of the roller vine turners consists of a U-shaped rear bracket 70 having a plate 71 welded to its upper edge and V-notches 72 in its lower edge adapted to receive the tool bar 23 therein, as best shown in Figure 10. Two U-bolts 73 embrace the tool bar 23 and pass through suitable perforations in the plate 71, being secured to the latter by nuts 74 on the threaded ends of the bolts. The legs of the U-shaped bracket 70 extend forwardly and downwardly and are pivotally connected by a transverse bolt 75 to a pusher frame 76 comprising a pair of laterally spaced, forwardly reaching parallel bars 80. The front ends of the bars 80 are pivotally connected by a transverse bolt 81 to lugs 82 provided on the roller support frame 83, and guide members 84 are welded to each of the bars 80 intermediate of the ends thereof, projecting upwardly on either side of said roller support frame. The latter consists of a bar bent into the general shape of an L having a horizontal runner portion 85 and a vertical portion 86, and is braced by a diagonal strut 90. The front end of the horizontal runner portion 85 is bent upwardly and apertured, as at 91, to receive the shank 92 of a ball bearing member 93, said shank having a flange 94 adapted to bear against the top side of the bar 85 and threads on the end portion projecting below the bar for receiving a clamping nut 95 thereon. The upper end of the shank 92 is provided with a ball 96 which is received within a socket member 97 mounted on the lower end of the tapered roller 100. The upper end of the vertical portion 86 of the frame bar is bent forwardly to provide a curved portion 101 arcuate about the center of the ball 96 and having a plurality of holes 102. The upper end of the roller 100 is journaled on a ball bearing member 103 mounted on the arcuate portion 101 and comprising a shank 104 having a ball 105 at one end thereof and a flange 106. The ball 105 is disposed within a socket 110 fixed to the upper end of the roller 100, and the opposite end of the shank 104 is received within a suitable aperture in a plate 111 with the flange 106 bearing against the plate and preferably welded thereto. The plate 111 is also provided with two holes 112 spaced to coincide with holes 102, and bolts 113 are passed through aligned holes 102, 112 and secured by nuts 114 on the threaded ends thereof. The angle of the roller 100 relative to the line of advance of the tractor can be increased or decreased to meet varying harvesting conditions by merely removing the bolts 113 and moving the plate 111 up or down along the arcuate portion 101 to align the holes 112 with another pair of holes 102. The bolts 113 are then replaced in the aligned holes and the nuts 114 tightened. Best results are obtained by setting the roller so that the vines travel up the roller as high as possible before being separated, but without any vines pulling over the top of the roller. The correct angle varies with different heights and conditions of vines and with the speed of the tractor and can be ascertained only by experiment. In order that the roller 100 may rotate freely on the bearing balls 96, 105 at all times, the frame 83 is made somewhat flexible and the strut 90 is connected thereto at one end by an adjustable connection comprising a lug 115 provided on the vertical frame portion 86 and having a longitudinal slot 116 formed therein. A connecting bolt 120 is passed through the slot 116 and a suitable bolt hole in the strut 90, and by shifting the bolt 120 in the slot 116, the upper and lower bearings 93, 103 are separated or drawn together, as the case may be, to provide more or less clearance between the bearing balls and their respective sockets. The lower bearing 93 is shielded against trash and low vines lying close to the ground by a boot 121 which is fixed to the front end of the frame member 85 in any suitable manner and extends up over the lower end of the roller.

Mounted on the front end of the tractor 10 and extending ahead thereof to open a path through the tangled vines for the dirigible truck 13, is an inner or center roller vine turner or plant guiding means 122 which is identical to the outer vine turners or plant guiding means 33 but is connected to the tractor by means which will now be described. A mounting bracket 123 is secured to the steering post 30 by U-bolts 124 (Figure 2), and fixed to the bracket 123 by a clamping member 125 and bolts 126 is a downwardly and forwardly extending beam 130, preferably of square or rectangular cross section. The beam 130 is braced by a pair of tubular bracing members 131 which are suitably fixed to the tractor frame 11 on either side of the steering post 30 and curve downwardly and forwardly therefrom, being secured to the beam 130 by a clamping member 132 and bolts 133. A forwardly extending pushing member 134 is pivotally connected by a transverse bolt 135 to the lower end of the beam 130 and is connected by a pivot bolt 136 to the frame of the center roller vine turner.

The tools are raised and lowered between operative and inoperative positions by the tractor power lift, indicated generally by the reference numeral 140, and the depth at which the tools operate, as well as the lifting of the tools, is controlled by two similar mechanisms disposed on opposite sides of the tractor. For a detailed description of the construction and operation of the power lift, reference may be had to Patent No. 2,107,760 granted to McCormick, Worthington, and Stewart on February 8, 1938. An actuating rock shaft 141 projects laterally from the ends of a transversely disposed housing 142 mounted on the rear end of the tractor 10, and clamped to each end of the rock shaft 141 is a forked lifting arm 143. A collar 144 is rotatably supported between the ends of the forked lifting arm 143 on trunnions 145, and slidably received within said collar is a push rod 146 which extends forwardly to a bifurcated arm 150 fixed to the transverse portion 20' of the upper bail member 20. A sleeve 151 is rotatably supported between the ends of the bifurcated arm 150 on trunnions 152 and is adapted to receive the front end of the push rod 146, allowing the latter to turn freely within the sleeve 151 while restraining axial movement relative thereto.

Each lifting mechanism preferably comprises a pipe 147 disposed ahead of the collar 144 and embracing the rod 146 in sliding engagement therewith. A set collar 148 is adjustably fixed to the rod 146 and spaced ahead of the front end of the pipe 147 a short distance when the tools are lowered in operative position to provide for a limited amount of lost motion in the lifting connections. In the operation of the power lift 140, the lifting arm 143 is rocked, causing the pipe 147 to engage the set collar 48, thereby effecting a forward movement of the rod 146. Inasmuch as the rod 146 is connected to the upper end of the arm 150, and the latter is connected to the bail member 20, a forward movement of the rod 146 causes a clockwise rotation of bail member 20, resulting in the lifting of the tool bar 23 and associated tools out of operating position.

The depth of operation of the tools mounted on the tool bar 23 is controlled by means of a stop device comprising a sleeve 153 which is threaded upon a suitably threaded portion of the rod 146. The outer periphery of sleeve 153 is of rectangular cross-section and is provided with a flange stop 154 at the front end thereof. A holding member 155 having a similar rectangular aperture adapted to cooperate with the periphery of the sleeve 153 is slidably but non-rotatably engaged with said sleeve and is adjustably fixed to the front end of a rod 156. The rear end of rod 156 is pivotally connected at 160 to a depth gauging hand lever 161 which is connected by a pivot bolt 162 to a bracket 163 mounted on the tractor rear axle housing 11'. The hand lever 161 is locked in position by the usual latch mechanism 164 engaging a notched sector 165 fixed to the bracket 163, thereby locking the holding member 155 against longitudinal displacement. As the tool bar 23 moves downwardly into operative position, the lever arm 150 rocks counter-clockwise, as viewed in Figure 2, moving the push rod 146 and sleeve 153 rearwardly. The flange stop 154 abuts against the front end of the holding member 155, limiting further rearward movement of the push rod 146, and the depth of operation of the harvesting blades 31 is thus determined by the longitudinal position of the holding member 155 as regulated by the lever 161.

Finer depth adjustment may be secured by turning a hand wheel 166 which is fixed to the rear end of each of the push rods 146, rotating the latter to change its position with respect to the sleeve 153 in which its forward end is threaded. When rod 146 is rotated, the sleeve 153 is prevented from turning with it by the holding member 155.

The lost motion provided by the gap between the front end of the pipe 147 and set collar 148 enables the lifting mechanism to raise the tools on the tool bar 23 to substantially the same elevated position each time regardless of the depth setting as adjusted by the sleeve 153 and holding member 155. Under certain conditions it is desirable to utilize the full effective stroke of the lifting arms 143 in raising the roller vine turners, however, and to this end a separate set of lifting connections have been provided which are operatively connected with the pipe 147. The pipe 147 is also connected to the lifting arm 143 by means of a short link or bar 170 which is fixed, as by welding, to the rear end of the pipe and is journaled on the inner trunnion 145, so that the pipe 147 moves with the arm 143 through the full stroke of the latter. Provided on each of the pipes 147 and extending upwardly therefrom is a lug 171, and journaled in the lug on the right hand pipe 147 is the outwardly turned rear end of a fore and aft extending push rod 172. The front end of push rod 172 is pivoted at 173 (Figure 1) to an arm 174 which is fixed to a rock shaft 175 and curves downwardly and rearwardly therefrom. Rock shaft 175 is supported in suitable bearing means carried on the mounting bracket 123, and is fixed to a forwardly extending lifting arm 176. A lifting chain 180 is fastened to the end of lifting arm 176 by a connecting bolt 181 and is secured to the center roller vine turner frame at 182. A loop of chain 183 is passed around the beam 130 and connected to chain 180 adjacent the lower end thereof to act as a snubber for the center roller vine turner when the latter passes over a depression in the ground and tends to nose down.

When the power lift 140 is actuated, the pipe 147 and push rod 172 are caused to move forwardly, rocking the rock shaft 175 in a counter-clockwise direction and lifting the center vine turner on lifting arm 176. The chain 180, being a flexible element, is in the nature of lost-motion means, whereby when the tools 31 and the vine turner or plant guiding means 122 are in their lowered position, the latter is capable of upward movement independent of the tools 31.

A longitudinally disposed push rod 184 is pivotally connected at its rear end to the lug 171 provided on the left hand pipe 147, and is pivoted at its front end to an arm 185 clamped to a transverse rock shaft 186. The latter is journaled in a pair of laterally spaced bearings 190 carried on a transversely disposed beam 191 which is fixed in any suitable manner to the bracket 123. A pair of spaced lifting arms 192 are clamped to the rock shaft 186 and extend downwardly therefrom, each of said arms lying substantially in the vertical plane of its respective outer vine turner 33. Fastened to the end of each of the arms 192 is a chain 193 which is also connected to the vine turner frame and which serves as both lifting chain and snubber chain to prevent the vine turners from nosing over. When the power lift is actuated, the pipe 147 and push rod 184 are moved forwardly, rocking the rock shaft 186 in a clockwise direction and lifting the two outer roller vine turners 33 on lifting arms 192. Since the chains 193 are also flexible elements, they form lost-motion means, whereby the outer vine turners or plant guiding means 33 may also move upward independent of the tools 31.

In certain types of power lifts such as the hydraulic lift 140 illustrated herein, the actuating rock shaft 141 is not returned from raised to lowered position by the positive application of power but depends, rather, on the weight of the implements to rock the shaft back to normal position. To facilitate the lowering of the tools to operative position, especially when using a minimum of operating units, a return spring 194 has been provided, one end of the spring being fastened to a link 195 pivoted at 196 to a bracket 200 fixed to the lifting arm 143 and the other end being anchored to a lug 201 provided on the bracket member 163. The spring 194 urges the rock shaft 141 to rotate in a counter-clockwise direction and speeds up the lowering of the tools to the ground.

Referring now to Figures 11 and 12, the embodiment illustrated therein is similar in most respects to the previously described embodiment with the exception of the roller vine turners which have been replaced with a single boot vine turner disposed ahead of the tractor dirigible truck 13. Like the vine turners 33 described above, the single boot vine turner 202, described below, also serves to guide plants toward the blades 31.

This type of bean harvester operates as satisfactorily under certain crop conditions as the previously described embodiment and has the additional advantage of being cheaper to manufacture. It will be noted in Figure 11 that the arrangement of the blades 31 and standards 45 has been reversed on the tool bar and that the cutting edges 31' of each pair of blades face inwardly and converge rearwardly, with the windrow rods 56 forming two windrows between the rear tractor wheels. Another point of difference is that the two inner dividers have been dispensed with and the windrow rods 56 attached to the lugs 47 on the standards 35. In this way the inner standards 35 can be clamped to the inner ends of the tool bars 23 and the blades 31 positioned beneath the tractor, by virtue of the offset 45 in the standard, to accommodate extremely close row spacings.

The boot vine turner or plant guiding means, indicated in its entirety by the reference numeral 202 comprises a supporting frame 203 fixed to the tractor, an arched fender 204 pivoted on the front end of the frame 203, and a lifting device operatively connected with one of the pipe members 147 for swinging the fender 204 up to inoperative position.

The frame 203 consists of a transversely disposed bracket member 205 fixed to the lower portion of the steering post 30 in any suitable manner and having its ends bent forwardly to provide lugs 206. A pair of spaced side members 210 are connected to the lugs 206 by bolts 211 passed through any of several holes 212 in the ends of members 210, and extend forwardly and downwardly therefrom, being connected together at their front ends by a transverse rod 213. A pair of bracing struts 214 are bolted to the bracket collar 27 on the steering post 30 and extend downwardly and forwardly, being connected to their respective side members 210 by bolts 215 passed through any of several adjusting bolt holes in the struts and side members.

Journaled on the rod 213 substantially midway between the side members 210 is a supporting arm 216 which extends rearwardly and terminates in an arched portion 220 to which the fender 204 is fixed. The fender 204 is raised to inoperative position by means of a U-shaped member 221, the legs of which are journaled on the rod 213, and the transverse portion of which is adapted to engage and pick up the arm 216 when the member is rocked in a clockwise direction (Figure 12).

A push rod 222 is pivoted at its rear end in the lug 171 provided on the right hand pipe 147, and extends forwardly therefrom, being pivotally connected at its front end to a lever arm 223 fixed on a transverse rock shaft 224 journaled in the side members 210. A second lever arm 225 is fixed to the rock shaft 224 and a link 226 is pivotally connected to its end. The other end of the link 226 is connected to a lever arm 230 fixed to one leg of the U-shaped member 221. Thus, when the power lift 140 is actuated, the pipe 147 and push rod 222 are moved forwardly, rotating the rock shaft 224 in a clockwise direction and causing the U-shaped member 221 to rotate likewise, picking up the arm 216 and fender 204 and swinging them backwardly and upwardly to inoperative position.

A spring 231 is fastened at one end to a bracket member 232 fixed on the arm 216 and is hooked at the other end through an eye bolt 233 secured to the U-shaped member 221 to hold the fender 204 yieldingly down to its work. The spring 231 and associated parts permit the fender 204 to move upwardly independently of the position of the blades 31, thus in effect forming lost-motion means.

What we claim as our invention is:

1. A row crop harvester comprising, in combination, a wheel supported frame having a transversely disposed tool bar, a tool standard having an offset to one side, means connecting said standard to said tool bar providing for lateral adjustment of the standard relative to the tool bar, and a blade fixed to the bottom of said standard, the cutting edge of said blade being disposed at an angle to the line of travel of said frame.

2. A row crop harvester comprising, in combination, a wheel supported frame having a transversely disposed tool bar, a tool standard having a forwardly curving lower portion and a foot at the end thereof, means for connecting said standard to said tool bar at any of several lateral spaced positions, a blade having a cutting edge disposed at an angle to the line of travel of said frame, and means countersunk substantially flush with the bottom surface of said blade for connecting the latter to the bottom of said foot.

3. A row crop harvester comprising, in combination, a wheel supported frame having a transversely disposed tool bar, at least one left and one right cutting unit carried on said tool bar, each of said cutting units comprising a tool standard having an offset to one side and a forwardly curving lower portion provided with a foot at the end thereof, a blade for each of said standards, means for connecting each of said blades to the bottom of its respective foot comprising a bolt countersunk flush with the bottom surface of said blade and secured by a nut recessed below the top surface of said foot, the cutting edges of said blades being disposed at an angle to the line of travel of said frame and facing toward opposite sides thereof, and clamping means for detachably connecting said standards to said tool bar in any of several lateral positions.

4. A row crop harvester, comprising, in combination, a wheel supported frame, a tool standard carried on said frame and having a downwardly and forwardly curved lower portion provided with a foot member at the lower end thereof, a blade member, and means for fixing said blade member to the bottom of said foot member comprising two spaced connecting bolts countersunk into the bottom side of said blade member and passed through aligned holes in said members, one of said members having a third hole provided therein adapted to coincide with one of the holes in the other of said members to provide an alternate hole for one of said bolts whereby the angle of the cutting edge of said blade relative to the line of travel of said frame can be changed.

5. A bean harvester comprising, in combination, a wheeled frame having a tool supporting member, a tool standard carried on said member, a generally fore and aft extending blade fixed to the lower end of said standard for cutting the bean vines, said blade having a cutting edge disposed at an angle to the line of travel of said frame, means for guiding the cut vines into windrows to one side of the blade, said means comprising a divider disposed ahead of said blade and having at least one windrow rod fixed to and extending rearwardly therefrom to the rear end of the blade substantially parallel with the cutting edge of the blade, and means for connecting said divider to said tool supporting member in any of several lateral positions.

6. A bean harvester comprising, in combination, a wheeled frame having a tool supporting member, a tool standard carried on said member, a blade fixed to the lower end of said standard for cutting the bean vines, said blade having a cutting edge disposed at an angle to the line of travel of said frame, a divider carried on said tool supporting member and movable relative thereto between a lowered position for deflecting the vines to one side of said blade and a raised position in which the divider is adapted to receive and hold a colter, and means for clamping said divider to said tool supporting member in either of said positions.

7. A bean harvester comprising, in combination, a wheeled frame having a tool supporting member, a tool standard carried on said member, a blade fixed to the lower end of said standard for cutting the bean vines, said blade having a cutting edge disposed at an angle to the line of travel of said frame, means for deflecting the cut vines to one side of said blade and depositing the same in windrows, said means comprising a divider fixed to said tool supporting member and extending downwardly and forwardly therefrom, a windrow rod extending rearwardly from said divider above and alongside the cutting edge of said blade, and means for securing said windrow rod to said divider on either side thereof and in any of several vertical positions relative to the ground.

8. A bean harvester comprising, in combination, a wheeled frame, a transverse tool supporting member connected with said frame for vertical movement relative thereto, a pair of laterally spaced standards fixed to said tool supporting member and having substantially horizontal blades at their lower ends, the cutting edges of said blades being disposed at an angle to the line of advance of said frame and facing toward opposite sides thereof, a roller vine turner disposed ahead of and between said standards, and means connecting said roller vine turner to said tool supporting member for relative vertical movement.

9. A bean harvester comprising, in combination with a tractor, a transverse draft beam adapted to be fixed at one end to the tractor body and extending laterally outward therefrom, a transverse tool bar disposed to the rear of said draft beam and connected thereto for relative vertical movement, a pair of laterally spaced standards having substantially horizontal blades fixed to the lower ends thereof, laterally adjustable means for connecting said standards to said tool bar, a roller vine turner disposed ahead of and between said standards, and means shiftable laterally for connecting said vine turner to said tool bar.

10. In combination with a tractor having a body, a bean harvester comprising a pair of transverse draft beams disposed on opposite sides of said tractor and fixed at their inner ends to the tractor body, a pair of transverse tool bars spaced rearwardly from said draft beams, link means connecting each of said tool bars to its respective draft beam for vertical movement relative thereto, a pair of laterally spaced standards mounted on each of said tool bars and adjustable laterally relative thereto, each of said standards having a substantially horizontal blade fixed to its lower end, a pair of laterally spaced dividers mounted on each of said tool bars and adjustable laterally relative thereto, each of said dividers extending ahead of its respective blade and having a windrow rod extending diagonally rearwardly therefrom to deflect the cut vines to one side of the blade and deposit them in windrows, a pair of roller vine turners disposed on opposite sides of said tractor, each of said vine turners being positioned intermediate its respective pair of dividers and ahead thereof, laterally adjustable bracket means mounted on each of said tool bars between said dividers, and link means connecting each of said roller vine turners with its respective bracket means for vertical movement relative thereto.

11. In combination with a tractor having an engine driven power lift and a body supported at the front end on a dirigible truck, a bean harvester attachment comprising a pair of transverse beams disposed on opopsite sides of said tractor and fixed to the tractor body, a transverse tool bar connected to each of said beams for vertical movement relative thereto, a pair of laterally spaced standards fixed to each of said tool bars and having harvesting blades fixed to their lower ends, a pair of outer roller vine turners disposed on opposite sides of said tractor midway between each pair of blades and positioned ahead thereof, a bracket fixed to each of said tool bars, means for connecting each of said outer roller vine turners to its respective bracket for relative vertical movement, an inner roller vine turner disposed ahead of said dirigible truck and substantially in line therewith, means for connecting said inner roller vine turner to said tractor for relative vertical movement, lifting means actuated by said power lift mechanism for raising said tool bars from operative to inoperative position, lift mechanism operatively connected with said lifting means for raising said outer roller vine turners from operative to inoperative position, and a lifting device operatively connected with said lifting means for raising said inner roller vine turner.

12. A roller vine turner for use with a row crop harvesting implement comprising, in combination, a supporting frame, a roller disposed at an angle to the line of advance of said implement, and means for rotatably supporting said roller on said frame including bearing means journaled on one end of said roller and fixed to said frame, a second bearing means journaled on the other end of said roller and adjustably mounted on said frame whereby the angle of said roller may be increased or decreased.

13. A roller vine turner for use with a row-crop harvesting implement comprising, in combination, a supporting frame, a roller disposed at an angle to the line of advance of said implement and having a socket portion at one end thereof, a bearing member fixed to said frame and having a ball portion journaled in said roller socket portion, bearing means journaled on the other end of said roller, and means for adjustably connecting said bearing means to said frame along an arc described about the center of said ball portion.

14. A roller vine turner for use with a row-crop harvesting implement comprising, in combination, a supporting frame, a roller disposed at an angle to the line of advance of said implement and having socket members provided in the upper and lower ends thereof, a bearing member fixed to said frame and having a ball portion received in and journaled in said lower socket member, said frame having a curved portion arcuate about the center of said ball portion, a second bearing member having a ball portion adapted to be received in said upper socket member and journaled therein, and means for adjustably mounting said second bearing member on the curved portion of said frame.

15. The combination with a tractor having a dirigible front truck, of a vine turner comprising a supporting frame fixed to and extending ahead of said tractor, an arched fender disposed ahead of and in alignment with said truck, means pivotally connecting said fender to said frame for vertical swinging, means having lost motion for raising said fender from operative to inoperative position, and means for yieldingly holding said fender down into operative position.

16. The combination with a tractor having a dirigible front truck, of a vine turner comprising a supporting frame mounted on said tractor, an arched fender disposed ahead of said truck, means pivotally connecting said fender to said frame for vertical swinging, means engageable with said pivotal connecting means for raising said fender from operative to inoperative position, and spring means for yieldingly holding said fender down into operative position.

17. The combination with a tractor having a dirigible front truck and engine driven power lift mechanism, of a vine turner comprising a supporting frame mounted on said tractor, an arched fender disposed ahead of said truck, means pivotally connecting said fender to said frame for vertical swinging, lift means engageable with said pivotal connecting means and having lost motion therebetween for raising said fender from operative to inoperative position, and means operatively connecting said lift means with said power lift mechanism.

18. In combination with a tractor having a power lift, a ground working tool, supporting linkage mounted on said tractor providing for raising and lowering said tool relative to said tractor, a threaded rod attached to said linkage and adapted for engagement with said power lift to raise said tool, said power lift being free to move in the opposite direction independent of said rod, a sleeve threaded coaxially on said threaded rod, a stop member disposed on said sleeve, and means adjustably supported on said tractor for axial movement relative to said threaded rod for engaging said stop member to limit the extent of downward movement of said tool.

19. In combination with a tractor, a ground working tool, supporting linkage therefor mounted on said tractor and providing for movement of said tool relative to said tractor, means for controlling the position of said tool comprising a member movable in one direction to shift said tool in one direction, a stop device adjustable on said member, a stop adjustable relative to said member and engageable with said stop device to limit the movement of said tool in the other direction, and means for controlling the position of said stop.

20. In combination with a tractor having a body supported at its rear end on a pair of laterally spaced driving wheels and at its front end on a dirigible truck, with steering connections to said dirigible truck, a bean harvester comprising blade carrying members disposed on opposite sides of and mounted on said tractor body, a vine turner disposed ahead of said dirigible truck for deflecting the standing vines out of the path of the truck, means connecting said vine turner to said tractor for vertical movement, and means for raising and lowering said vine turner relative to the tractor.

21. In combination with a tractor, a bean harvester comprising a transverse tool bar connected with the tractor for vertical movement relative thereto, a standard having a harvesting blade fixed to its lower end, means shiftable along the length of said tool bar for clamping the standard thereto, a vine divider extending ahead of the blade and having a rearwardly extending windrow rod adapted to deflect the cut vines to one side of the blade and deposit the same in windrows, and means shiftable along the length of the tool bar for clamping the divider thereto.

22. In combination with a tractor, a bean harvester comprising a transverse tool bar connected with the tractor for vertical movement relative thereto, a standard having a harvesting blade fixed to its lower end, means for clamping said standard to said tool bar, a vine divider extending ahead of said blade, at least one windrow rod fixed to said divider and extending rearwardly therefrom along the length of the blade for deflecting the cut vines into windrows, means for clamping the divider to said tool bar, and means on said tractor for raising and lowering said tool bar and attached devices between ground working and transport positions.

23. In combination with a tractor, a bean harvester comprising a transverse tool bar connected with the tractor for vertical movement relative thereto, a standard having a harvesting blade fixed to its lower end, means for clamping said standard to said tool bar, a vine divider extending ahead of said blade, at least one windrow rod fixed to said divider and extending rearwardly therefrom along the length of the blade for deflecting the cut vines into windrows, means for clamping the divider to said tool bar, lifting mechanism connected with said tool bar for raising and lowering the tool bar and attached devices between ground working and transport positions, and means connected with the tractor engine and with said lifting mechanism for actuating the latter including means for adjusting the working height of the blade above the surface of the ground.

24. A tool standard for use on a bean harvester of the class described comprising clamping means for non-rotatably securing the standard to a transverse tool bar, said clamping means being adapted for movement along the length of the tool bar, said standard being offset laterally from said clamping means and extending downwardly and forwardly therefrom, a foot provided at the lower end of said standard, and a substantially horizontal blade fixed to said foot and having a cutting edge disposed at an angle to the line of forward travel of the implement.

25. A tool standard for use on a bean harvester of the class described comprising clamping means for non-rotatably securing the standard to a transverse tool bar, said clamping means being adapted for movement along the length of the tool bar, said standard being offset laterally from said clamping means and extending downwardly and forwardly therefrom, a foot provided at the lower end of said standard, a substantially horizontal blade adapted to be fixed to the underside of said foot, and bolts extending through said blade and foot for securing the same together, said bolts being countersunk flush with the top of the foot and the bottom of the blade to provide uninterrupted surfaces over which vines may pass freely.

26. A tool standard for use on a bean harvester of the class described comprising clamping means for non-rotatably securing the standard to a transverse tool bar, a foot provided at the lower end of said standard, a blade adapted to be fixed to the underside of said foot and having a cutting edge disposed at an angle to the line of travel of the implement, and means for securing said blade to said foot comprising two spaced connecting bolts countersunk into the bottom side of the blade and extending through aligned holes in the blade and foot, said foot having a third hole provided therein adapted to coincide with one of the holes in the blade to provide an alternate hole for one of the bolts whereby the angle of the cutting edge can be changed.

27. A tool standard for use on a bean harvesting implement of the class described comprising a generally vertical beam having a forwardly facing clamping member fixed to the upper end thereof and adapted to engage a transverse tool bar on the implement, a cap member adapted to cooperate with said clamping member for non-rotatably securing said tool bar therebetween, a substantially horizontal harvesting blade fixed to the lower end of the beam and having a cutting edge disposed at an angle to the line of travel of the implement, a rearwardly projecting lug formed on the back side of said beam and having a transverse hole provided therein, a windrow rod having one end adapted to be received in said transverse hole, said windrow rod extending rearwardly from said lug along the length of the blade cutting edge and serving to deflect the cut vines into windrows, and means for fixedly securing said windrow rods to said lug.

28. In combination with a tractor, a bean harvester comprising a transverse tool bar connected with the tractor for vertical movement relative thereto, a pair of laterally spaced standards having harvesting blades fixed to their lower ends, means for clamping said standards to said tool bar, a pair of vine dividers disposed between said standards and adapted to be mounted on said tool bar, said dividers extending forwardly ahead of said blades and having windrow rods fixed thereto for deflecting the cut vines into windrows, a roller vine turner disposed between and appreciably ahead of said dividers, and means for clamping said vine turner to said tool bar between said dividers.

29. In combination with a tractor, a bean harvester comprising a transverse tool bar connected with the tractor for vertical movement relative thereto, a pair of laterally spaced standards having harvesting blades fixed to their lower ends, means for clamping said standards to said tool bar, a pair of vine dividers disposed between said standards and adapted to be mounted on said tool bar, said dividers extending forwardly ahead of said blades and having windrow rods fixed thereto for deflecting the cut vines into windrows, a roller vine turner disposed between and appreciably ahead of said dividers, a bracket member adapted to be clamped to said tool bar, link means connecting said vine turner to said bracket member for vertical movement relative thereto, lifting mechanism connected with said tool bar for raising and lowering the same between working and transport positions, a second lifting mechanism connected with said roller vine turner, and means connected with the tractor engine and with both of said lifting mechanisms for actuating the same.

30. For use with a tractor having a dirigible front truck, a vine turner comprising a supporting frame mounted on and extending ahead of said tractor, an arm pivotally connected with said frame for vertical swinging movement, an arched fender disposed ahead of said truck and fixed to said arm, a U-shaped member pivotally connected with said frame for vertical swinging, the bight portion of said U-shaped member being disposed beneath and engageable with said arm for raising the fender from operative to inoperative positions, and means for swinging said U-shaped member upwardly.

31. The combination with a tractor having a supporting wheel, of a vine turner comprising a supporting frame fixed to said tractor, an arched fender disposed ahead of and in alignment with said wheel, means pivotally connecting said fender to said frame for vertical swinging, means having lost motion for raising said fender from operative to inoperative position, and means for yieldingly holding said fender down into operative position.

32. The combination with a tractor having laterally spaced rear wheels and a dirigible front truck, of supporting means secured to the tractor at each side thereof generally between the front and rear wheels of the tractor, vine deflecting means movably connected with said supporting means and disposed ahead of said rear wheels so as to deflect vines away from the path of movement thereof, a vine deflector for said front truck comprising a supporting frame mounted on said tractor, an arched fender disposed ahead of said truck, means pivotally connecting said fender to said frame for vertical swinging, and means for raising both the rear vine deflectors and said front fender comprising means for raising the rear vine lifters and means actuated by said last mentioned means and having a lost motion connection with said fender, and means for yieldingly holding said fender down into operative position.

33. In a construction comprising a tractor having an axle, a harvesting unit, means mounting the harvesting unit at one side of the axle for vertical movement, a plant-guiding unit, means mounting the plant-guiding unit at the other side of the axle for vertical movement, the combination therewith of means interconnecting the units for causing vertical movement of one unit to effect vertical movement of the other unit.

34. In a construction comprising a tractor, a harvesting unit, means mounting the harvesting unit on a tractor for vertical movement, a plant-guiding unit, means mounting the plant-guiding unit on the tractor for vertical movement, the combination therewith of means interconnecting the units for causing vertical movement of one unit to effect vertical movement of the other unit.

35. In a construction comprising a tractor, a harvesting unit, means mounting the harvesting unit on the tractor for vertical movement, a plant-guiding unit, means mounting the plant-guiding unit on the tractor for vertical movement, the combination therewith of means interconnecting the units for causing vertical movement of the harvester unit to effect vertical movement of the plant-guiding unit.

36. In a construction comprising a tractor having an axle, a harvesting unit, means mounting the harvesting unit at one side of the axle for vertical movement, a plan-guiding unit, means mounting the plant-guiding unit at the other side of the axle for vertical movement, the combination therewith of means interconnecting the units for causing vertical movement of the harvesting unit to effect vertical movement of the plant-guiding unit.

37. In a construction comprising a tractor having an axle, a harvesting unit positioned at one side of the axle, a plant-guiding unit positioned at the other side of the axle, the combination therewith of means connecting the harvester unit to the tractor for vertical movement, means connecting the plant-guiding unit to the tractor for vertical movement, and means interconnecting the connecting means for causing vertical movement of one unit to effect vertical movement of the other unit, said last means including lost-motion means whereby the plant-guiding unit has a vertical upward movement independently of the vertical movement of the harvesting unit.

38. In a construction comprising a tractor having an axle, a harvesting unit, means mounting the harvesting unit at one side of the axle for vertical movement, a plant-guiding unit, means mounting the plant-guiding unit at the other side of the axle for vertical movement, the combination therewith of means interconnecting the units for causing vertical movement of the harvester unit to effect vertical movement of the plant-guiding unit and including lost-motion means for allowing an independent vertical movement of the plant-guiding unit.

39. In a construction comprising a tractor of the row crop type having a single front wheel means and laterally spaced rear wheel means, a pair of plant harvesting units, means mounting said harvesting units on the tractor generally at opposite sides thereof and rearwardly of said front wheel means for generally vertical movement, a plant guiding unit, means mounting the plant guiding unit at the forward side of said front wheel means for generally vertical movement, the combination therewith of means interconnecting the harvesting units and the plant guiding unit for causing generally vertical movement of one to effect generally vertical movement of the other.

40. An agricultural machine adapted to be mounted on a tractor of the row crop type having laterally spaced rear wheels and a centrally disposed front wheel means, comprising a pair of plant harvesting units disposed in laterally spaced relation, means for mounting said units for generally vertical movement relative to the tractor at opposite sides thereof and rearwardly of said front wheel means, a plant guiding unit, means for mounting the plant guiding unit for generally vertical movement relative to the tractor forwardly of said front wheel means for deflecting plants and the like from the path of said front wheel means, and means interconnecting the units for causing the generally vertical movement of one to effect generally vertical movement of the other.

41. An agricultural machine adapted to be mounted on a tractor of the row crop type having laterally spaced rear wheels and generally centrally disposed front wheel means, comprising a pair of draft bars adapted to be attached to the front portion of the tractor and extending laterally outwardly from opposite sides thereof, a pair of plant harvesting units, means movably connecting said units, respectively, with said draft bars, a plant guiding unit, means for movably connecting said plant guiding unit with the front portion of the tractor so as to dispose the same for generally vertical movement in front of said front wheel means, means for raising both of said plant harvesting units, and means operated thereby for raising said plant guiding unit therewith.

42. An agricultural machine adapted to be mounted on a tractor of the row crop type having laterally spaced rear wheels and generally centrally disposed front wheel means, comprising a pair of plant harvesting means adapted to be disposed generally rearwardly of said front wheel means and forwardly of said rear wheel means generally in front of the latter, means mounting said pair of plant harvesting means for generally vertical movement relative to the tractor, a plant guiding unit adapted to be disposed in front of said front wheel means, means for movably connecting said plant guiding unit with the forward portion of the tractor for generally vertical movement relative thereto, and means interconnecting the plant guiding means and the plant harvesting means for causing generally vertical movement of one to effect generally vertical movement of the other.

43. An agricultural machine as defined in claim 42, further characterized by each of said plant harvesting means including a pair of laterally spaced units disposed generally adjacent to but at laterally opposite sides of the generally vertical longitudinal plane of the associated rear tractor wheel, and plant guiding means for clearing a path for each rear wheel, disposed generally between the plant harvesting units of the associated pair of units.

44. In a construction comprising a tractor of the row crop type having central front wheel means and laterally spaced rear wheels and an axle, a harvesting unit, means mounting the harvesting unit at one side of the axle for generally vertical movement relative to the tractor, a pair of plant guiding units, means mounting one of the plant guiding units at the other side of the axle for generally vertical movement relative to the tractor substantially in the vertical longitudinal plane of one of the rear wheels and generally forward of said one wheel, means mounting the second plant guiding unit also at said other side of the axle for generally vertical movement relative to the tractor and in a position laterally inwardly of said one plant guiding unit, plants passing between said plant guiding units moving into the harvesting unit laterally inwardly of said one rear tractor wheel, and means interconnecting the harvesting and plant guiding units for causing vertical movement of one to effect vertical movement of the other.

45. In a construction comprising a tractor of the row crop type having central front wheel means and laterally spaced rear wheels and an axle, a harvesting unit, means mounting the harvesting unit at one side of the axle for generally vertical movement relative to the tractor, a pair of plant guiding units, means mounting one of the plant guiding units at the other side of the axle for generally vertical movement relative to the tractor substantially in the vertical longitudinal plane of one of the rear wheels and generally forward of said one wheel, means mounting the second plant guiding unit also at said other side of the axle for generally vertical movement relative to the tractor and in a position laterally inwardly of said one plant guiding unit, plants passing between said plant guiding units moving into the harvesting unit laterally inwardly of said one rear tractor wheel, a rockshaft on the tractor, means connecting said rockshaft with said harvesting unit and both of said plant guiding units, and means for rocking said rockshaft to raise both the harvesting and plant guiding units.

46. In a construction comprising a tractor of the row crop type having central front wheel means and laterally spaced rear wheels and an axle, a harvesting unit, means mounting the harvesting unit at one side of the axle for generally vertical movement relative to the tractor, a pair of plant guiding units, means mounting one of the plant guiding units at the other side of the axle for generally vertical movement relative to the tractor substantially in the vertical longitudinal plane of one of the rear wheels and generally forward of said one wheel, means mounting the second plant guiding unit also at said other side of the axle for generally vertical movement relative to the tractor and in a position laterally inwardly of said one plant guiding unit, plants passing between said plant guiding units moving into the harvesting unit laterally inwardly of said one rear tractor wheel, a rockshaft on the tractor, link means extending from said rockshaft to both the harvesting unit and the plant guiding units for raising both the latter and the harvesting unit simultaneously, said link means accommodating generally vertical movement of the plant guiding units relative to the harvesting unit, and means on the tractor for operating said rockshaft.

MILES H. TUFT.
CLARENCE T. RASMUSSEN.